M. U. BERNHEIM.
FRICTION REDUCING BEARING.
APPLICATION FILED OCT. 31, 1908.
1,136,089.
Patented Apr. 20, 1915.
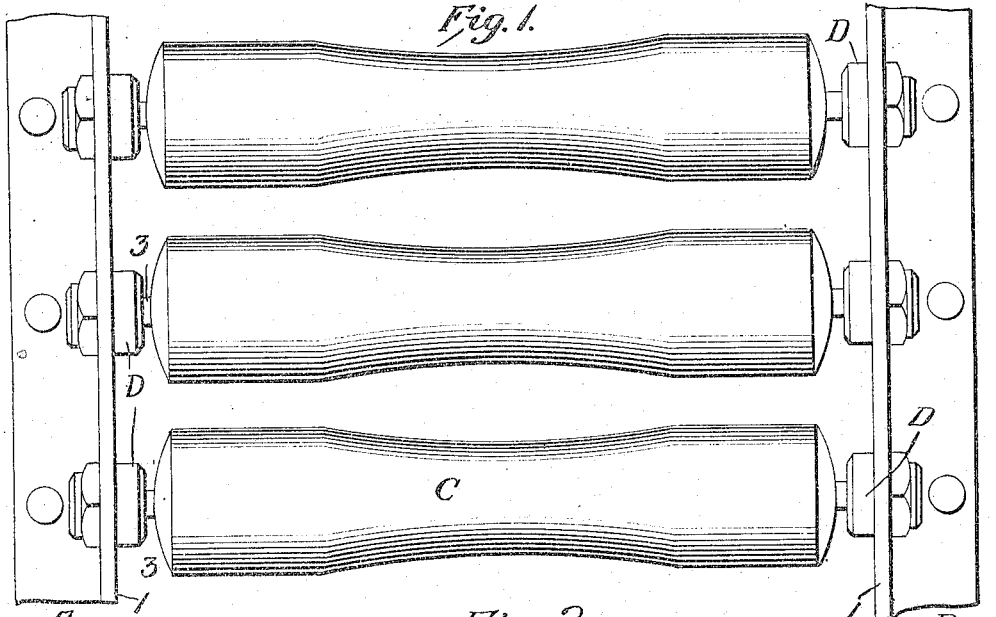
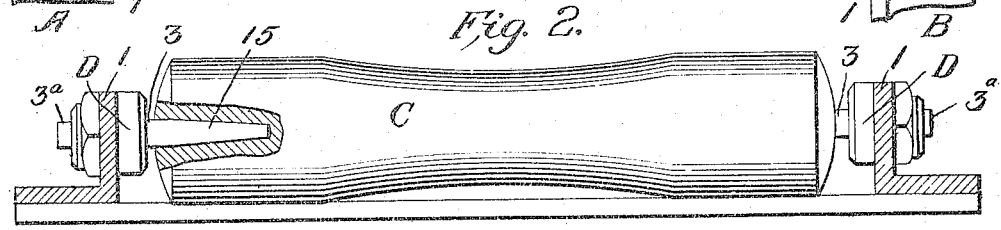
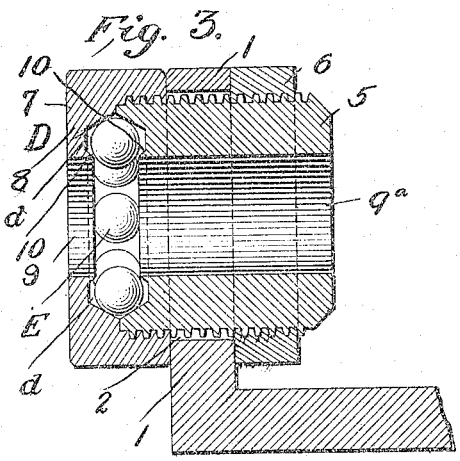
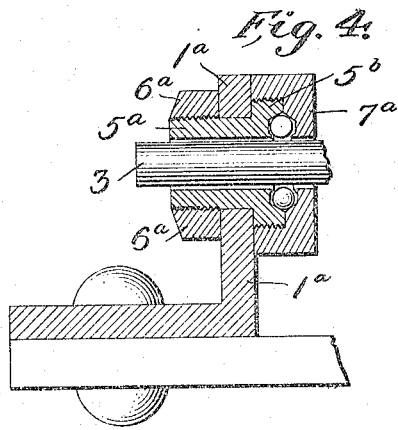
Witnesses
Jos. F. Collins
Carl G. Sterzer
Inventor
Morris U. Bernheim
By C. J. Stockman
Attorney

UNITED STATES PATENT OFFICE.

MORRIS U. BERNHEIM, OF LOUISVILLE, KENTUCKY, ASSIGNOR, BY MESNE ASSIGNMENTS, TO THE ALVEY-FERGUSON COMPANY, OF OAKLEY, CINCINNATI, OHIO, A CORPORATION OF OHIO.

FRICTION-REDUCING BEARING.

1,136,089. Specification of Letters Patent. Patented Apr. 20, 1915.

Application filed October 31, 1908. Serial No. 460,386.

*To all whom it may concern:*

Be it known that I, MORRIS U. BERNHEIM, a citizen of the United States, residing at Louisville, in the county of Jefferson and State of Kentucky, have invented certain new and useful Improvements in Friction-Reducing Bearings, of which the following is a specification.

This invention relates to improvements in bearings and particularly to bearings which are adapted for use as supports for the rollers which are frequently employed to form the bed or way of gravity and other conveying mechanisms.

Among the principal purposes of the present invention is the provision of bearings adapted to permit such rollers to rotate with a minimum of friction, and of construction such that they may be most readily applied to and removed from the frame elements which form the supports for the bearings, and will permit the removal and insertion of individual rollers of the conveyer whenever desired, and also of construction such that the balls or like friction reducing elements therein are held against displacement equally as well when disengaged from as when engaged with the rollers of the conveyer. Each of the bearings herein illustrated accomplishes the above purpose and moreover is of simple, durable and inexpensive construction and adds materially to the appearance of the conveyer.

The bearings forming the present invention are particularly useful for conveyers of any type or construction wherein the floors are provided with rollers. Therefore I have in the accompanying drawings illustrated the bearings as embodied in a conveyer of such type, although I do not intend thereby to be understood as restricting the invention to this particular use or embodiment.

In the drawings:—

Figure 1 is a plan view of a portion of a gravity conveyer. Fig. 2 is a cross section through the same, taken on a line between any two rollers thereof: showing a part of one end of a roller broken to disclose the pin or shaft therein. Fig. 3 is an enlarged cross section through a bearing and frame-side, without the conveyer roller. Fig. 4 is a cross-section of a modified form of the device.

The same characters of reference designate the same parts in the several views.

A and B designate the side members of the frame of the conveyer and C designates the rollers which form the bed or way of the conveyer.

In the illustrated embodiment of the invention the side members of the frame are each composed of angle iron, having one member (1) pierced at intervals to form openings 2 for the reception of the bearings D: and the rollers are of the form shown in Patent No. 714,432 issued to B. H. Alvey, November 25, 1902. It will be understood however that the particular construction of the frame and rollers is not essential to the present invention.

Each bearing comprises a male member and a female member entirely independent of the roller C which is to be sustained thereby. The male member is of a length adapted to extend through the side member 1 of the frame and to receive a clamping element at the end remote from the ball race, a portion of which is formed in the extremity of the end of said male member, and the female member engages the end of the male member and also engages the side of the frame member 1 opposite that engaged by the clamping element hereinbefore referred to, and is of cap or analogous shape having a flange which sets over the end of the male member and is grooved to form, with a corresponding groove in the male member, the race for the balls, rollers or other rotative devices which are employed to reduce the friction between the bearing and the contiguous shaft 3 of a conveyer-roller C. This shaft extends through the male and female members of the bearing, the former being hollow and the flange of the latter having an opening for such purpose. Moreover, the male and female members are formed with lips or projections at the mouth of the ball-race, for holding the balls within the race. These features are common to both of the illustrated embodiments of the invention. They may be embodied in other specific forms without departure from the spirit of the invention or the scope of the subjoined claims.

Referring now to the form of bearing shown best in Fig. 3, it will be seen that the male member 5 is shown as a hollow externally threaded nut, extending through the frame element 1. Upon the threads of this nut there is mounted an internally threaded clamping nut 6 which bears against the inner surface of the frame-element 1. A second nut 7 is also threaded upon the nut 5 and bears against the outer surface of the frame element 1, these two nuts thus serving to secure the bearing to the frame. The second nut 7 moreover constitutes the female member of the bearing, being formed with a flange 8 which extends over the forward edge of the nut 5. This flange is formed with an aperture or bore 9 which is in alinement with the aperture or bore 9ª through the nut 5. Through these apertures or bores the shaft or pin 3 of a roller C extends. The abutting faces of the nuts 5 and 7 are formed with complementary apertures forming a ball race $d$ which is closed throughout, except at the portion which is presented to the bore of the bearing and this open portion or mouth of the race is provided at each side with lips 10 which serve to restrict the same to a diameter less than that of the balls E, whereby the balls are prevented from falling from the race when not engaged with the shaft 3.

A construction such as that just described has important advantages, for the reason that it is of very simple and inexpensive construction and may be most easily and readily applied to the frame element 1, it being only necessary, in assembling the parts, first, to arrange the member 5 in the member 7, second, insert the balls in the race, next adjust these two members relatively to each other until the balls are held, then insert the member 5 through an aperture 2 in the frame-element 1 until the member 7 engages the outer surface of said element, and finally insert and screw-up the clamping nut 6 against the other surface of said frame-element 1. The bearing is thus fixedly though removably secured to the frame element 1 and is ready for the roller C which may be applied now or at any subsequent time. This is a feature of considerable importance in the conveyer-art, for the reason that it makes it quite convenient and practicable to store and ship the frame-sides A and B with the bearings therein, so that the work of assemblage and the use of skilled labor at the place of use is materially lessened, it being only necessary, in applying the rollers to the frame, to insert their shafts in the bearings.

For convenience in applying the rollers C to the conveyer and the removal of individual rollers, the shafts or pins 3 are preferably formed separately from the rollers C and are removable therefrom. The rollers C are preferably of wood and the pins or shafts 3 revolve therewith, and preferably are tightly fitted to apertures 15 therein and held by friction, as shown in Fig. 2. These pins may also, as shown, be tapered at their inner ends to compensate for wear.

In applying the rollers C it therefore becomes necessary only to aline the rollers with its bearings, insert the pins through the bearings and to drive them to place in the ends of the rollers: while to remove any individual roller, it is only necessary to withdraw the pins or shafts therefrom, by the use of a proper tool. The shafts 3 may be prolonged to a place outside the plane of the outer surface of the bearing, sufficiently to afford a grasping portion 3ª for such tool, as shown in Fig. 3, in which event it will not be necessary to disturb the bearings thereof in order to remove a roller, or they may terminate flush with, or within the plane of the outer surface of their bearings, as shown in Fig. 1, but the latter arrangement is not as convenient as the former in the matter of removal of an individual roller.

The form shown in Fig. 4 is similar to that just described, except that the male member, designated 5ª, has a flange 5ᵇ which engages the outer surface of the frame-element 1ª. Upon this flange the female member 7ª is fitted. In this figure, 6ª designates the clamping nut, which is threaded upon the shank of the member 5ª and engages the inner surface of the frame-member 1ª as in the other form.

The form shown in Fig. 3 is preferred for the reason that accidental separation of the members is more certainly prevented for the reason that when the clamping nut is screwed home it forces the female member of the bearing so tightly against the frame-element 1 as effectually to prevent it from slackening on the male member.

It will be noted that the parts of the bearing may be assembled as a unit, at any time, for immediate or subsequent application to a conveyer with no probability of an accidental separation of the members or loss of any of the balls: the members being held by their threaded engagement with each other and the balls being held by the lips or projections 10 at the mouth of the race $d$. This is an advantage of considerable practical importance. In practice, the apertures in the male and female members forming the race, are respectively reamed out to give the illustrated tapered form thereto.

From the foregoing the construction, objects and advantages of my invention will readily be understood, and it will also be understood that changes may be made in the details of the construction without departing from the spirit of the invention or the scope of the subjoined claims. In fact, I wish it to be clearly understood that the drawings and language used in this entire specification are to be interpreted in an illustrative, and not in a restrictive sense.

Having now described the invention what I believe to be new and desire to secure by Letters Patent and therefore claim, is:—

1. A bearing for a roller, comprising a member adapted to extend through an aperture in a support and having an axial bore to receive a shaft of said roller, said member also having one of its ends formed with a recess which extends around the axial bore and has communication with the latter, the circumferential wall of said recess extending longitudinally outward beyond the wall of the recess which is adjacent to the bore, the latter wall forming a lip surrounding the bore; and a pair of clamping elements relatively adjustable on said member and disposed in a spaced relation to receive the support between them, one of said clamping elements projecting outward beyond the end of the bored-member and having an end flange spaced from the latter, said flange having its inner surface formed with a recess, said recess having a lip around the bore and an outer circumferential wall projecting inwardly beyond the vertical plane of the lip, the recesses of the bored-member and clamping element forming around said bore a race having a reduced mouth open to the bore, and anti-friction devices mounted in said race and having surfaces that are exposed between said lips, said devices being of greater diameter than the distance between the lips whereby the anti-friction devices are retained in position when the bearing is disconnected from the roller shaft.

2. A bearing for a roller, comprising a hollow externally threaded member adapted to extend through an aperture in a support and having one end formed with a recess having a lip adjacent to its bore, and a pair of nuts threaded on said member and mounted in a spaced relation so as to receive the support between them and to clamp the bearing upon the support, one of said nuts having a flange formed with an opening which is alined with the bore of said member, the flange having a recess and a lip which together with the recess and lip in the end of said member form a race which extends around the bore and has a restricted opening to the latter, and anti-friction devices in said race, said lips being arranged to retain the anti friction devices in place when the bearing is disconnected from the part which it sustains.

3. A bearing for a roller, comprising a member adapted to extend through an aperture in a support and having an axial bore to receive a shaft of said roller, said member also having at one end an externally-threaded shoulder, a nut threaded upon said shoulder and having a flange at its outer end, and a second nut threaded upon said hollow member and arranged in a spaced relation from the shoulder of the latter; the end of said hollow member and the flange of the first-mentioned nut having their confronting surfaces around the axial opening of the bore formed with complementary recesses whose walls adjacent to said bore form lips which are spaced apart, whereby a race having communication with said bore through a mouth of lesser diameter than the main portion of the race is formed around said bore, and anti-friction devices in said race, said anti-friction devices having greater diameter than the mouth of the race and having their surfaces arranged to be exposed through the space between said lips.

4. A bearing for a roller, comprising a member adapted to extend through an aperture in a support and having an axial bore to receive a shaft of said rolled, relatively adjustable clamping elements arranged in a spaced relation upon the circumferential surface of said member so as to receive the support between them and to clamp the bearing to said support, one of said clamping elements having an end flange, said flange and the confronting end of said member being formed with complementary recesses forming a race arranged to extend around said axial bore of the bearing and open thereto, and anti-friction devices in said race.

In testimony whereof I affix my signature, in presence of two witnesses.

MORRIS U. BERNHEIM.

Witnesses:
 Roy R. Werrael,
 R. Gotthardt.